(12) United States Patent
Baur et al.

(10) Patent No.: US 11,631,932 B2
(45) Date of Patent: Apr. 18, 2023

(54) ANTENNA ASSEMBLY

(71) Applicant: VEGA GRIESHABER KG, Wolfach (DE)

(72) Inventors: Roland Baur, Koenigsfeld (DE); Daniel Schultheiss, Homberg (DE)

(73) Assignee: VEGA GRIESHABER KG, Wolfach (DE)

( * ) Notice: Subject to any disclaimer, the term of this patent is extended or adjusted under 35 U.S.C. 154(b) by 1070 days.

(21) Appl. No.: 16/333,515

(22) PCT Filed: Aug. 24, 2017

(86) PCT No.: PCT/EP2017/071315
§ 371 (c)(1),
(2) Date: Mar. 14, 2019

(87) PCT Pub. No.: WO2018/050420
PCT Pub. Date: Mar. 22, 2018

(65) Prior Publication Data
US 2019/0260107 A1 Aug. 22, 2019

(30) Foreign Application Priority Data
Sep. 15, 2016 (DE) ..................... 10 2016 217 614.5

(51) Int. Cl.
*H01Q 1/22* (2006.01)
*G01F 23/284* (2006.01)
(Continued)

(52) U.S. Cl.
CPC ........... *H01Q 1/225* (2013.01); *G01F 23/284* (2013.01); *H01Q 1/36* (2013.01); *H01Q 1/40* (2013.01);
(Continued)

(58) Field of Classification Search
CPC ........ G01F 23/284; H01Q 1/225; H01Q 1/36; H01Q 1/40; H01Q 13/02; H01Q 21/28;
(Continued)

(56) References Cited

U.S. PATENT DOCUMENTS

| 6,107,973 A | 8/2000 | Knop et al. |
| 6,987,527 B2 | 1/2006 | Kossin |

(Continued)

FOREIGN PATENT DOCUMENTS

| CN | 101313200 A | 11/2008 |
| CN | 102967341 A | 3/2013 |

(Continued)

OTHER PUBLICATIONS

Combined Chinese Office Action and Search Report dated Jun. 1, 2020 in Patent Application No. 201780042957.4 (with English translation of Category of Cited Documents), 8 pages.

(Continued)

*Primary Examiner* — Timothy A Brainard
(74) *Attorney, Agent, or Firm* — Oblon, McClelland, Maier & Neustadt, L.L.P.

(57) ABSTRACT

The disclosure relates to an antenna array for a filling level measuring device. The antenna array comprises an antenna, a horn antenna, a plastic housing, a printed circuit board and a casting compound. The antenna is adapted to communicatively connect the printed circuit board to an external device, the horn antenna comprises the form of a hollow truncated cone, and at least an inner side of the horn antenna is provided with a metallic material. Furthermore, the antenna, the horn antenna, the printed circuit board and the casting compound are arranged within the plastic housing, and the antenna and the horn antenna are at least partially surrounded by the casting compound.

9 Claims, 8 Drawing Sheets

(51) Int. Cl.
  *H01Q 1/36* (2006.01)
  *H01Q 9/26* (2006.01)
  *H01Q 9/30* (2006.01)
  *H01Q 13/02* (2006.01)
  *H01Q 21/28* (2006.01)
  *H01Q 1/40* (2006.01)
  *H01Q 7/00* (2006.01)
  *H01Q 9/16* (2006.01)

(52) U.S. Cl.
  CPC .............. *H01Q 9/265* (2013.01); *H01Q 9/30* (2013.01); *H01Q 13/02* (2013.01); *H01Q 21/28* (2013.01); *H01Q 7/00* (2013.01); *H01Q 9/16* (2013.01)

(58) Field of Classification Search
  CPC .. H01Q 7/00; H01Q 9/16; H01Q 9/30; H01Q 9/265
  See application file for complete search history.

(56) References Cited

U.S. PATENT DOCUMENTS

| | | | |
|---|---|---|---|
| 7,872,610 B2 | 1/2011 | Motzer et al. | |
| 9,086,311 B2 | 7/2015 | Wegemann | |
| 2002/0126061 A1* | 9/2002 | Griessbaum | H01Q 13/02 343/786 |
| 2004/0056667 A1* | 3/2004 | Lutke | H01Q 1/225 324/644 |
| 2004/0212529 A1* | 10/2004 | Fehrenbach | G01S 7/034 342/124 |
| 2009/0128396 A1* | 5/2009 | Fehrenbach | H01Q 13/02 342/124 |
| 2013/0057366 A1* | 3/2013 | Wegemann | H01Q 13/02 333/239 |
| 2015/0135827 A1 | 5/2015 | Benz | |
| 2016/0013547 A1 | 1/2016 | Tishin et al. | |
| 2017/0299419 A1* | 10/2017 | Abrahamsson | G01S 7/003 |

FOREIGN PATENT DOCUMENTS

| | | | | |
|---|---|---|---|---|
| CN | 103606754 A | * | 2/2014 | |
| DE | 4443289 A1 | * | 6/1996 | ............ H01Q 19/09 |
| DE | 100 51 297 A1 | | 4/2002 | |
| DE | 102 48 915 A1 | | 4/2004 | |
| DE | 102004026560 A1 | * | 12/2005 | ........... G01F 23/284 |
| DE | 10 2004 041 857 A1 | | 3/2006 | |
| DE | 10 2005 049 500 A1 | | 5/2007 | |
| DE | 10 2010 061 714 A1 | | 5/2012 | |
| EP | 2 871 450 B1 | | 3/2016 | |
| GB | 1 555 754 | | 11/1979 | |
| TW | 367633 | | 8/1999 | |
| WO | WO 2007/042367 A1 | | 4/2007 | |

OTHER PUBLICATIONS

International Search Report dated Oct. 23, 2017 in PCT/EP2017/071315 filed Aug. 24, 2017.
Endress + Hauser, "Technische Information Micropilot FMR20," Jun. 28, 2016, pp. 1-52, XP055413384.
Endress + Hauser, "Installation Instruction UNI slip on flange," Aug. 25, 2016, pp. 1-8, XP055413401.
Vega Grieshaber KG, "Product information, Radar, Level measurement in liquids," Feb. 29, 2016, pp. 1-24, XP055412809.
Vega Grieshaber KG, "Vegapuls WL61; Radar sensor for continuous level measurement of water and wastewater," Jan. 31, 2014, pp. 1-2, XP055412953.
Combined Taiwanese Office Action and Search Report dated Mar. 5, 2021 in Patent Application No. 106129918 (with partial English language translation), 6 pages.

* cited by examiner

ANTENNA ASSEMBLY

FIELD OF THE INVENTION

The invention relates to an antenna array with an antenna, a horn antenna, a plastic housing and a printed circuit board. Furthermore, the invention relates to a filling level measuring device with the antenna array, in particular a radar wave filling level measuring device, e.g. for measuring a water level, for measuring a content within a container, or for measuring a depth of material in a container.

BACKGROUND OF THE INVENTION

It is known to attach an antenna on a printed circuit board of a filling level measuring device, for example a patch antenna, wherein the antenna can send and receive signals. In particular, the printed circuit board and the horn antenna of the filling level measuring device are arranged to each other, such that the patch antenna of the printed circuit board can pass signals through the horn antenna and can receive the signals again after a reflection. In this context, a filling level measuring device is known from the patent document EP 2 871 450 B1 of the applicant, wherein the filling level measuring device in particular comprises a microwave transmitter and an antenna which is connected to the microwave transmitter. The antenna comprises an outlet opening for a directed transmitting of microwave radiation, wherein the antenna can be a horn antenna. Furthermore, the antenna can be made of a metal coated plastic.

Furthermore, from DE 102 48 915 A1 a radar Sensor with a trough-shaped housing being open to the top is known, wherein the housing comprises a high-frequency part on its inner side in the area of the housing base. The high-frequency part comprises high-frequency patch antennas on its underside facing the housing base. The antennas are arranged on the underside of a high-frequency printed circuit board, are transmitting and receiving signals through the housing base and can abut directly at the housing base. A protective hood protectively covers the high-frequency part and the antennas. Above the high-frequency part, a low-frequency part is provided within the trough formed housing, wherein the low-frequency part in particular comprises a printed circuit board on which electric components are arranged. Above the printed circuit board, the housing is filled up substantially complete with filling material. The filling material, which is beneficially filled into the housing in a liquid state and which is cured subsequently, prevents that moisture can enter into the housing and can negatively influence the high-frequency part or the low-frequency part. Furthermore, by means of the filling material, a permanent and accurate position fixing of the low-frequency part and the high-frequency part is achieved. By providing the protective hood, a negative influence of the filling material on the sensitive high-frequency part is precluded.

Also, a further antenna can be provided within a filling level measuring device, wherein the antenna is adapted to enable a communication of the printed circuit board with an external device, for example a computer unit. By this, for example measuring data, which are stored in the printed circuit board, can be transmitted to the external device. Additionally, the external device can send control data to the printed circuit board, for example to control measurements of the filling level measuring device.

Unfortunately, it happens often, that the further antenna can be the victim of vandalism. Additionally, the horn antenna can impede the propagation of electromagnetic waves of the further antenna.

SUMMARY OF THE INVENTION

It is therefore an object of the present invention to provide an antenna array of the type mentioned above, which protects the antenna and the metallized obstacle against vandalism, and which further comprises a good circular radiation characteristic.

The problem is solved by the subject matter of the independent claims. The dependent claims, the following description and the Figures show beneficial embodiments of the invention.

According to a first aspect of the invention, an antenna array for a filling level measuring device is provided. The antenna array comprises an antenna, a horn antenna, a plastic housing, a printed circuit board and a casting compound.

The antenna is adapted to communicatively connect the printed circuit board to an external device, for example to a computer unit. In particular, the antenna can be a Bluetooth antenna in various structural shapes, e.g. in form of a monopole antenna, in form of a ring dipole antenna, or in form of a folded dipole antenna. Under the term "external" can particularly be understood, that the device is not a part of the antenna. If the antenna is a part of the filling level measuring device, then the external device is particularly also not a part of the filling level measuring device.

The antenna can for example be integrated into the printed circuit board. In particular, respective contacts of the antenna can be soldered with the printed circuit board. Furthermore, the antenna can be arranged spatially separated from the printed circuit board, wherein the antenna for example is connected via a wireless radio connection or via wires or cables in a known manner to the printed circuit board. Via the antenna, measuring data can be transmitted to the external device, in particular for a further evaluation. Further, instructions from the external device can be transmitted via the antenna to the printed circuit board, in particular to initiate or to control filling level measurements.

The horn antenna comprises the form of a hollow truncated cone. Such a form is particularly suitable for a filling level measuring device. Preferably, a ground plane or the printed circuit board (which can comprise the ground plane, or which can be a part of the ground plane) is arranged in an area of a cover area of the horn antenna being formed as a truncated cone, wherein the cover area is connected to a base of the horn antenna being formed as a truncated cone via a cavity within the horn antenna being formed as a truncated cone. By this arrangement, for example a patch antenna, which can be arranged on the printed circuit board, can emit microwaves or radar waves into the horn antenna and can receive microwaves or radar waves out of the horn antenna.

At least an inner side of the horn antenna is provided with a metallic material, e.g. a conductive silver lacquer, or is at least partially coated galvanically. The horn antenna can also consist completely of the metallic material. The metallic material enables that electromagnetic waves within the cavity of the horn antenna cannot leave the horn antenna via sidewalls of the horn antenna, wherein said sidewalls build the shell surface of the horn antenna being formed as a truncated cone. A horn antenna, which is only coated with the metallic material on the inner side, is particularly cheap and comprises a particularly low weight.

The antenna, the horn antenna, the printed circuit board and the casting compound are arranged within the plastic housing. In particular, the housing can be implemented in a one-piece manner or as several parts, hollow cylindrical, in a trough form with or without a lid, open or closed. Within the housing, elements of the antenna array are already partially protected against environmental influences and vandalism. The printed circuit board can for example be an FR4 printed circuit board with a closed shell surface.

The antenna and the horn antenna are at least partially surrounded or casted by the casting compound. In addition, the antenna can be tuned such that the antenna functions properly, if the housing is only casted partially. Thereby, the antenna is nonetheless surrounded by the casting material. Thereby, the filling level should at least cover a part of the antenna, as otherwise, the properties of the dielectric conductor cannot be utilized any longer. This could make sense, if e.g. less casting material shall be used due to weight reasons or cost reasons, and if a part of the volume to be filled for example is filled with a polystyrene form piece. In addition, the printed circuit board can be surrounded by or casted by the casting compound. In other words, at least the antenna and a part of the metallized obstacle of the antenna array are embedded in the casting compound. By this, the antenna as well as the metallized obstacle are not visible from the outside and, thus, protected against vandalism. The casting compound further enables or is adapted to guide electromagnetic radiation of the antenna in the sense of a dielectric conductor around the metal obstacle in form of the horn antenna, and to radiate the electromagnetic radiation on a side, which is in the shadow of the metal obstacle. By this, the antenna can comprise a particularly good circular radiation characteristic. Furthermore, a position of the antenna and the horn antenna within the housing and relative to the other components of the antenna array within the housing is fixed by means of the casting compound. The casting compound can be a plastic casting compound, e.g. a dielectric casting compound.

If the antenna is brought into a suitable position relative to the other components within the housing, also a transition from the plastic housing to an air surrounding the plastic housing can function as a reflector, wherein the metallized obstacle can function as a director. The position of the antenna in this case particularly depends on a form and a size of the metallized obstacle, and can be chosen such that reflections constructively superimpose each other at a fundamental frequency of the antenna.

In a first embodiment, the antenna is arranged between the plastic housing and the horn antenna, and the antenna is separated from the plastic housing and from the horn antenna by the casting material. In this first embodiment, the base of the horn antenna being formed as a truncated cone is preferably arranged in a base area of the housing. The antenna is preferably arranged between a sidewall of the housing and a shell surface of the horn antenna being formed as a truncated cone. The casting material is arranged between the antenna and the horn antenna being formed as a truncated cone. Preferably, the casting material surrounds the shell surface of the horn antenna being formed as a truncated cone completely or at least partially. Also preferably, the casting material completely surrounds the antenna. The casting material according to this embodiment particularly contributes to guide an electromagnetic radiation transmitted by the antenna around the horn antenna being formed as a truncated cone, and to radiate said electromagnetic radiation on the shadowed side.

In connection with the first embodiment as described above, it is particularly beneficial intended, that the antenna is a monopole antenna, the antenna is arranged at a ground plane, that a bar-shaped part of the antenna is arranged laterally next to the horn antenna being formed as a truncated cone. Preferably, the bar-shaped part of the antenna can run parallel to a central height of the horn antenna being formed as a truncated cone. Furthermore, the ground plane can rest on a cover area of the horn antenna being formed as a truncated cone. The inventor found out that the additional features as described above particularly enable that the antenna comprises a very broadband behavior with a very good circular radiation characteristic around the horn antenna being formed as a truncated cone. The central height of the horn antenna being formed as a truncated cone is a vertical connection between the cover area and a base of the horn antenna being formed as a truncated cone, wherein the central height connects the centers of the cover area and the base with each other.

The ground plane builds a necessary counterweight for the monopole antenna and can comprise the printed circuit board. Furthermore, the ground plane can be a part of the printed circuit board, e.g. an earth of the printed circuit board or a layer on the printed circuit board. However, the ground plane can also be a component, which is separated from the printed circuit board, and which serves to shield the printed circuit board. The ground plane or the printed circuit board can also comprise at least two parts, which are separated from each other, wherein only one of the two parts builds a necessary counterweight for the monopole antenna in the sense of a ground plane. The antenna can be connected to the ground plane, wherein the connector is situated laterally next to the height taxes of the horn antenna being formed as a truncated cone, and thus, is—so to say— arranged asymmetrically relative to the horn antenna being formed as a truncated cone. In this case, the bar-shaped part of the antenna protrudes from the underside of the ground plane. "Below the underside of the ground plane" in this context particularly means that surface of the ground plane, which faces the shell surface of the horn antenna being formed as a truncated cone.

According to another embodiment of the invention, the antenna is a ring dipole antenna, and an open ring of the ring dipole antenna runs with distance around a shell surface of the horn antenna being formed as a truncated cone. The horn antenna being formed as a truncated cone and the printed circuit board particularly can be equipped as described in connection with the first embodiment. The ring dipole antenna can particularly be connected to the underside of the printed circuit board. An according connector can particularly run symmetrically to the height axis of the horn antenna being formed as a truncated cone. The ring dipole antenna according to the second embodiment is particularly characterized by a very narrow, but very deep resonance. This has the advantage that the high selectivity of the antenna can be used for saving discrete components for filters on the printed circuit board. The very deep resonance delivers a very good adjustment of the antenna and, thus, reduces undesired reflection parts, which are reflected by the antenna back to the printed circuit board. Furthermore, the ring of the ring dipole antenna running around the shell surface of the horn antenna being formed as a truncated cone enables a particularly good circular radiation characteristic.

According to another embodiment of the invention, the antenna is a dipole antenna, wherein a bar-shaped part of the dipole antenna is arranged laterally ceramics to the horn antenna being formed as a truncated cone. Preferably, the bar-shaped part of the antenna can run parallel to a central height of the horn antenna being formed as a truncated cone. The ground plane is arranged between the horn antenna being formed as a truncated cone and the bar-shaped part of the dipole antenna, and the dipole antenna is separated from the plastic housing and from the horn antenna being formed as a truncated cone by the casting compound. The dipole antenna can be coated by ceramics and can be assembled on the printed circuit board.

In still another embodiment, the antenna is a dipole antenna, wherein the printed circuit board is arranged above a cover area of the horn antenna being formed as a truncated cone, and wherein the dipole antenna is arranged above the printed circuit board. A bar-shaped part of the dipole antenna can preferably run parallel to the cover area of the horn antenna being formed as a truncated cone, and the printed circuit board is separated from the dipole antenna and from the horn antenna being formed as a truncated cone by the casting material. The antenna can also be assembled as a component on the printed circuit board or on a small additional printed circuit board. In this case, there is no casting compound between the antenna and the printed circuit board.

In particular, the casting compound comprises a dielectric constant ("DK" value) of 2.5 or higher. The DK value has influence on the size, which the antenna must have. At a higher DK value, the antenna can be dimensioned smaller. In particular, a λ/4 rod antenna can be dimensioned smaller (i.e. in particular shorter). At a lower DK value, the antenna must be dimensioned larger. In particular, a λ/4 rod antenna must be dimensioned larger (i.e. in particular longer). By a DK value of 2.5 or higher, the antenna can be dimensioned particularly small, which in particularly enables mechanical advantages regarding the accommodation of the antenna, if space is restricted.

According to a second aspect of the invention, a filling level measuring device is provided, which comprises an antenna array according to the first aspect of the invention. To avoid repetitions, regarding effects, advantages and embodiments it is referred to the above explanations regarding the antenna array according to the first aspect of the invention.

SHORT DESCRIPTION OF THE FIGURES

In the following, embodiments of the invention are explained in more detail with reference to the accompanying schematic drawing, wherein identical or similar elements in the various figures are provided with the same reverence sign.

DETAILED DESCRIPTION OF EMBODIMENTS

Figure 1:
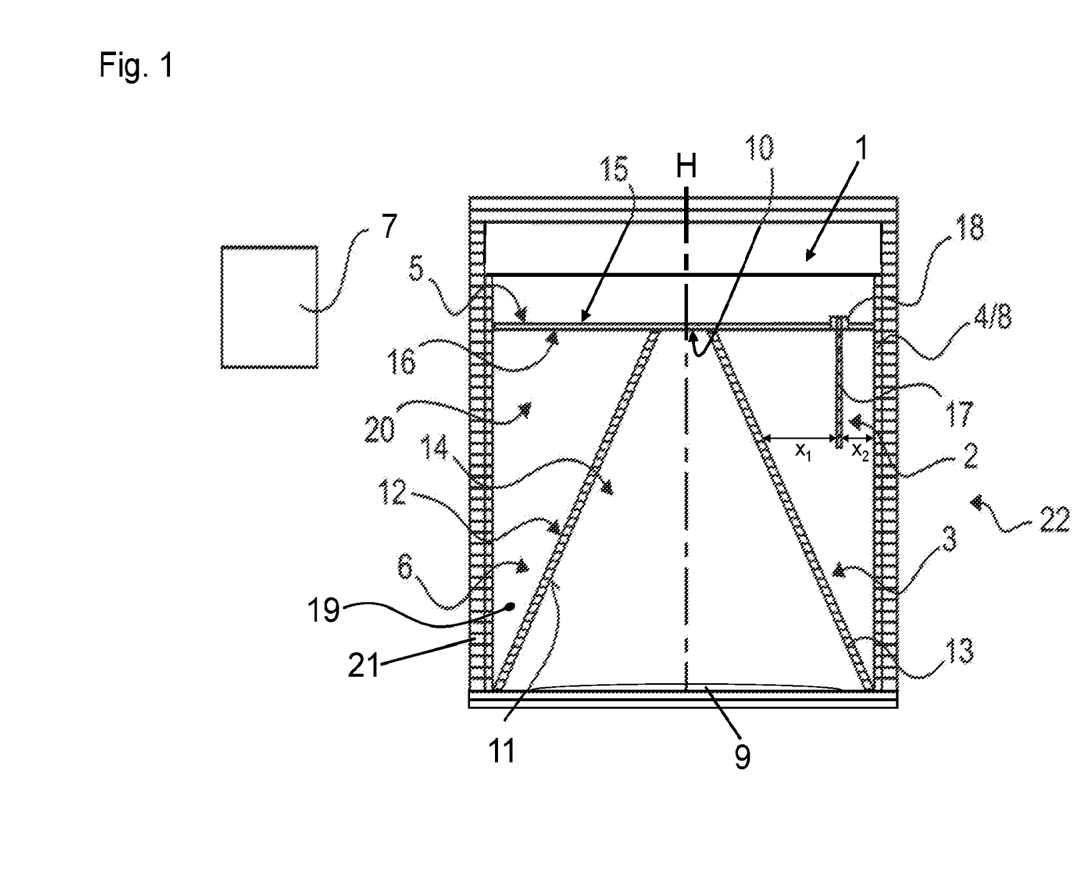
FIG. 1 is a longitudinal sectional view of a first embodiment of an antenna array according to the invention with a monopole antenna within an outer housing of a filling level measuring device.

FIG. 1 shows an example of a first embodiment of an antenna array 1 according to the invention, wherein the antenna array comprises an antenna 2, e.g. a Bluetooth antenna, a horn antenna 3, a housing 4 made of plastic, a printed circuit board, a ground plane 5 and a casting compound 6.

The housing 4 consists e.g. of polyvinylidene fluoride (PVDF) or a polyphenylene sulphide (PPS), e.g. Fortron®-PPS. The housing 4 comprises a cylindrical sidewall 8, and is implemented open on both front sides. The housing 4 builds a cavity between the sidewall 8, in which the antenna 2, the horn antenna 3, the printed circuit board, the ground plane 5 and the casting compound are arranged.

The housing 4 further builds the horn antenna 3 in a one-piece manner, wherein the horn antenna 3 comprises the form of a hollow truncated cone. In the sense of such a hollow truncated cone, the horn antenna comprises a plane circular base 9, a plane circular cover area 10, an inner shell surface 11, and an outer shell surface 12. A cone wall 13 of the horn antenna 3 builds the inner shell surface 11 and the outer shell surface 12. Between the inner shell surface 11, the base 9 and the cover area 10, the horn antenna builds a cavity 14, which is in the shape of a truncated cone. The base 9 constitutes an opening, which can be closed by an outer housing 21 of a filling level measuring device 22, which is not shown in further detail. Furthermore, the outer housing 21 also closes the housing 4, which is open upwardly. The cover area 10 of the horn antenna 3 being formed as a truncated cone is implemented in a closed manner. Feeding means (not shown) for the horn antenna 3 can be in the area of the cover area 10. The inner shell surface 11 of the horn antenna 3 is provided with a metallic material, e.g. a conductive silver lacquer.

Figure 2:
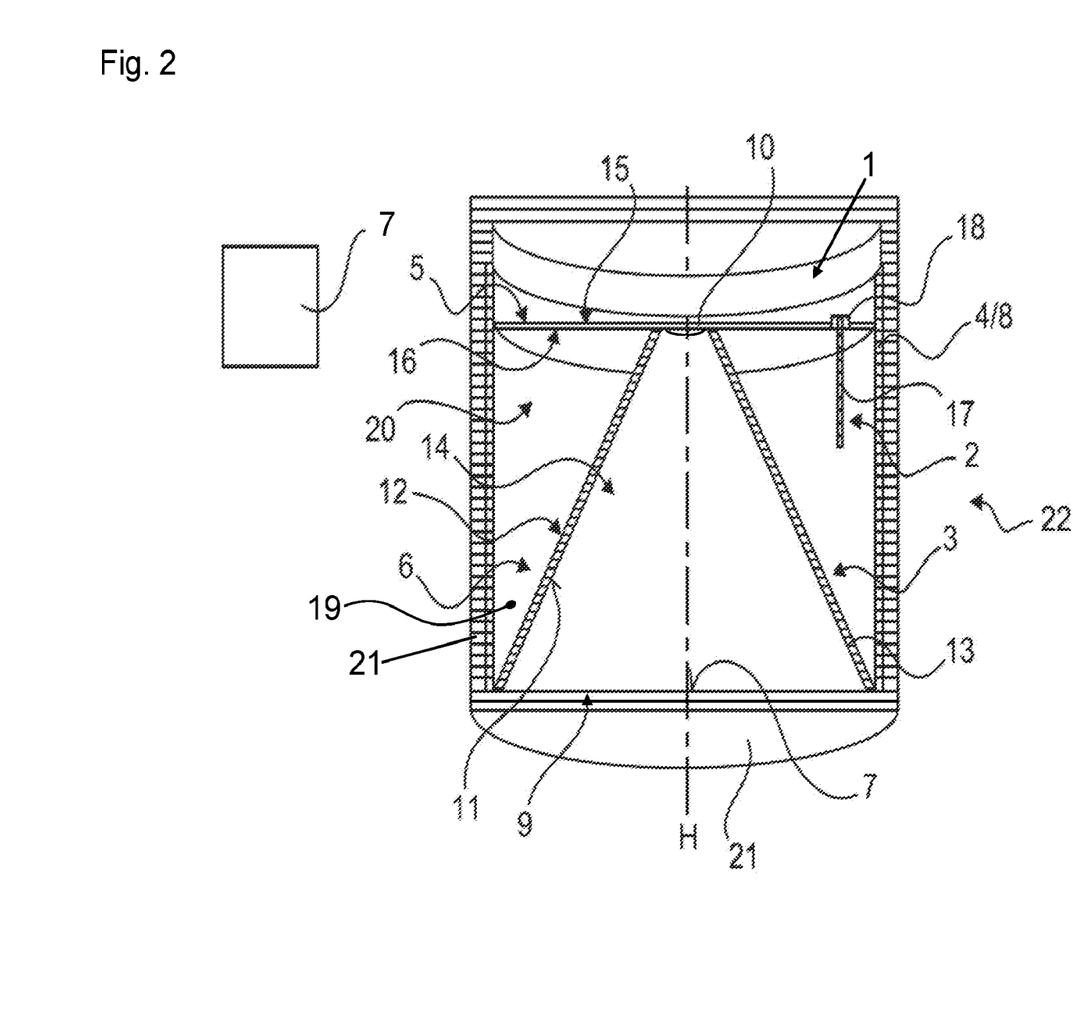
FIG. 2 is a perspective view of the antenna array as per FIG. 1.

The ground plane 5 can comprise a printed circuit board. Furthermore, the ground plane 5 can be a part of the printed circuit board, e.g. an earth of the printed circuit board or a layer on the printed circuit board. However, the ground plane 5 can also be a component, which is separated from the printed circuit board, and which serves to shield the printed circuit board. The ground plane 5 comprises a top surface 15 and a bottom surface 16. The top surface 15 of the ground plane 5 faces away from the horn antenna 3, and the bottom surface 16 of the ground plane 5 faces the horn antenna 3. The bottom surface 16 of the ground plane 5 rests upon the cover area 10 of the horn antenna 3. An area value of the bottom surface 16 of the ground plane 5 is higher than an area value of the cover area 10 of the horn antenna 3. Thus, only a part of the bottom surface 16 of the ground plane 5 rests upon the cover area 10 of the horn antenna 3. The remaining part of the bottom surface 16, which does not rest upon the cover area 10, extends substantially in a direction of a thought extension of the cover area 10 up to the sidewall 8 of the housing 4. The ground plane 5 can e.g. be a thin metal sheet, which top surface 15 and bottom surface 16 are circular (FIG. 2). A diameter of the top surface 15 and of the bottom surface 16 can thereby correspond to an inner diameter of the sidewall 8 of the housing 4, or can be slightly smaller.

In the embodiment shown by FIG. 1, the antenna 2 is a monopole antenna in form of a λ/4 rod antenna, which can be operated at a frequency of 2.4 GHz. The antenna 2 comprises a bar-shaped part 17, which runs parallel to a central height axis H of the horn antenna 3. The bar-shaped part 17 of the antenna 2 penetrates the ground plane 5, and is attached onto the top surface 15 of the ground plane 5 in a connection area 18. By this, the ground plane 5 can build a necessary counter weight for the monopole antenna 2. The antenna 2 can also receive data from the printed circuit board, and can transmit said data to an external device 7, e.g. a computer. Furthermore, the antenna 2 can receive data from the external device 7, and can transmit said data to the printed circuit board. By this, the antenna is adapted to communicatively connect the printed circuit board to the external device 7.

The antenna 4 can for example be fed via a coaxial cable (not shown), which is connected to the printed circuit board, which—as described above—can be a part of the ground plane or which can be arranged as a component being separated from the ground plane at any different position within the housing 4. The ground plane 5 can thereby shield the antenna 4 from the printed circuit board, which is an particularly advantage with regards to electromagnetic compatibility (EMC). The ground plane 5 runs substantially vertical to the height axis H of the horn antenna 3. Thus, also the bar-shaped part 17 of the antenna 2 and the ground plane 5 are arranged substantially vertical to each other. The antenna 2 is arranged between the horn antenna 3 and the housing 4. Thus, the bar-shaped part 17 of the antenna 2 runs laterally next to the horn antenna 3 being formed as a truncated cone. Also, the bar-shaped part 17 of the antenna 2 runs parallel to the central height H or height axis of the horn antenna 3 being formed as a truncated cone. The central height H of the horn antenna being formed as a truncated cone is thereby a vertical connection between the cover area 10 and the base 9 of the horn antenna 3 being formed as a truncated cone, wherein the central height H connects the centers of the cover area 10 and the base 9 with each other. The height axis builds a double-sided extension of the height H.

In the embodiment as shown per FIGS. 1 and 2, a distance $x_1$ between the bar-shaped part 17 of the antenna 2 and the height axis H of the horn antenna 3 is approximately 5 times as high as a distance $x_2$ between the bar-shaped part 17 of the antenna 2 and the sidewall 8 of the housing 4. However, these distances are only exemplary and not mandatory. The inventors have determined the distances of the antenna 2 by simulation and experiments, wherein the distances are optimal regarding the form and the size of the horn antenna 3, such that reflections do not constructively superimpose each other in their fundamental frequency, when the antenna 2 is being operated. The length of the bar-shaped part 17 of the antenna 2 arises out of the intended frequency range of 2.4 GHz of the antenna 2 and out of the DK value of the casting compound 6.

An interior space 19 between the outer shell surface 12 of the horn antenna 3, an inner surface of the sidewall 8 of the housing 4 as well as the upper open front of the housing 4 is completely filled with the casting compound 6. Thus, the casting compound 6 completely surrounds the antenna 2, the printed circuit board, the ground plane 5 as well as the outer shell surface 12 of the horn antenna 3. The antenna 2 is separated from the housing 4 and from the horn antenna 3 by the casting material 6. According to the exemplary embodiment as per FIG. 1, the casting compound 6 is a dielectric casting compound, which comprises a DK value of 2.5. Due to the casting compound 6, in particular the antenna 2 is not visible from the outside and is protected against vandalism. The casting compound 6 contributes to guide an electromagnetic radiation, which is transmitted from the antenna 2, around the horn antenna 3, which is a metallic obstacle, and to radiate the electromagnetic radiation from an area, which is actually shadowed by the horn antenna 3. In FIG. 1, this shadowed area is provided with the reference sign "20". The casting compound 6 thus fulfils the function of an dielectric conductor. Furthermore, the position of the antenna 2 within the housing 4 as per FIG. 1 allows that, at a transition from the plastic housing 4 or the outer housing 22 to an air surrounding the plastic housing 4 or the outer housing 22, the antenna 2 functions as a reflector, wherein the horn antenna 3 functions as a director.

Figure 3:
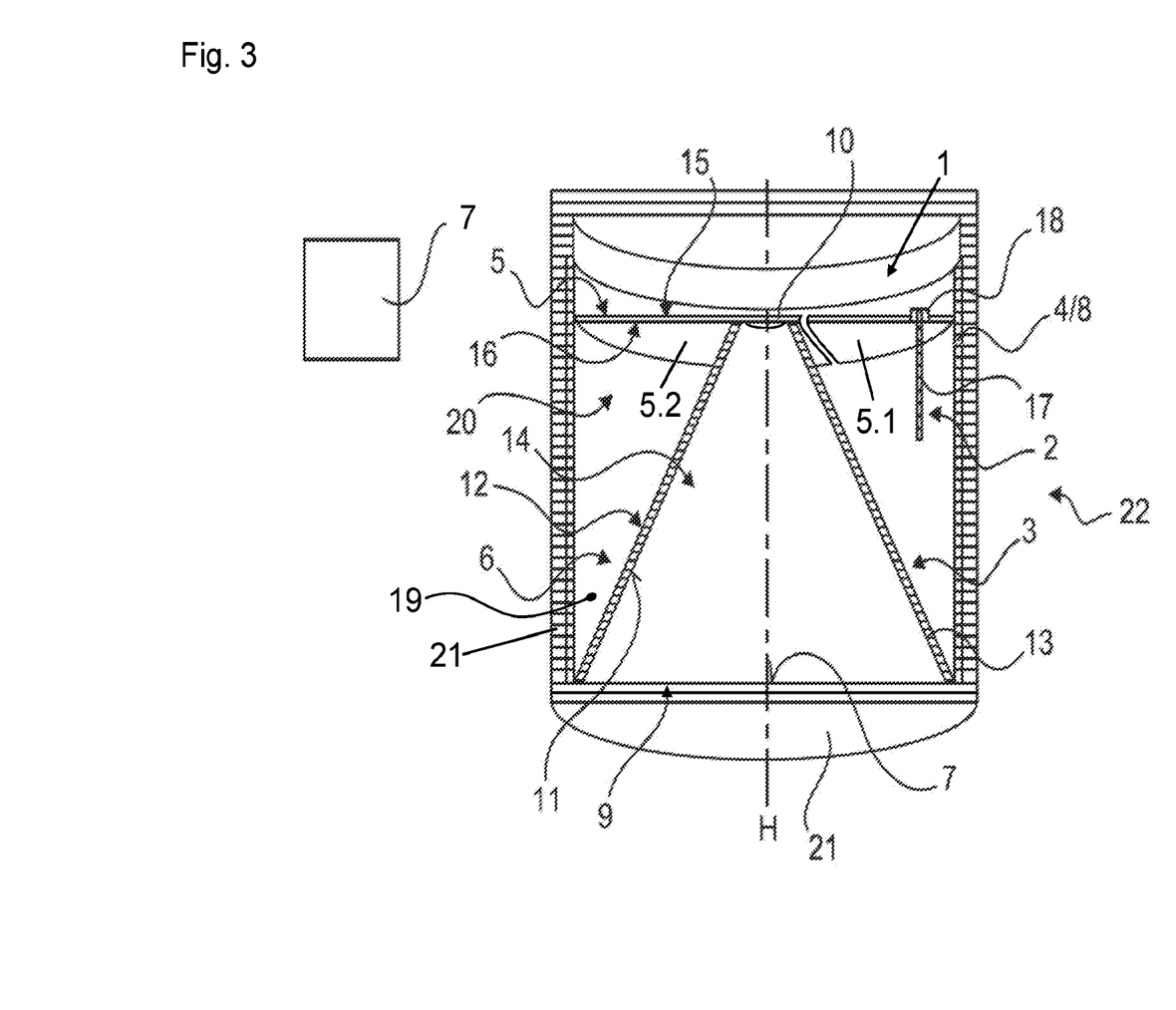
FIG. 3 is a perspective view of another embodiment of an antenna array according to the invention with a monopole antenna within an outer housing of a filling level measuring device.

FIG. 3 shows another embodiment of an antenna array 1 according to the invention, wherein the antenna array 1 is designed similarly as the antenna array 1 as per FIGS. 1 and 2. To avoid repetitions, only the differences are described in the following. The ground plane 5 or the printed circuit board can, according to FIG. 3, be divided into a first part 5.1 and into the second part 5.2, wherein the first part 5.1 and the second part 5.2 can be separated from each other. The antenna 4 is connected with the first part 5.1 of the ground plane or the printed circuit board, such that only the first part 5.1 serves as a ground plane for the antenna, and not the second part 5.2 of the ground plane 5 or the printed circuit board.

Figure 4:
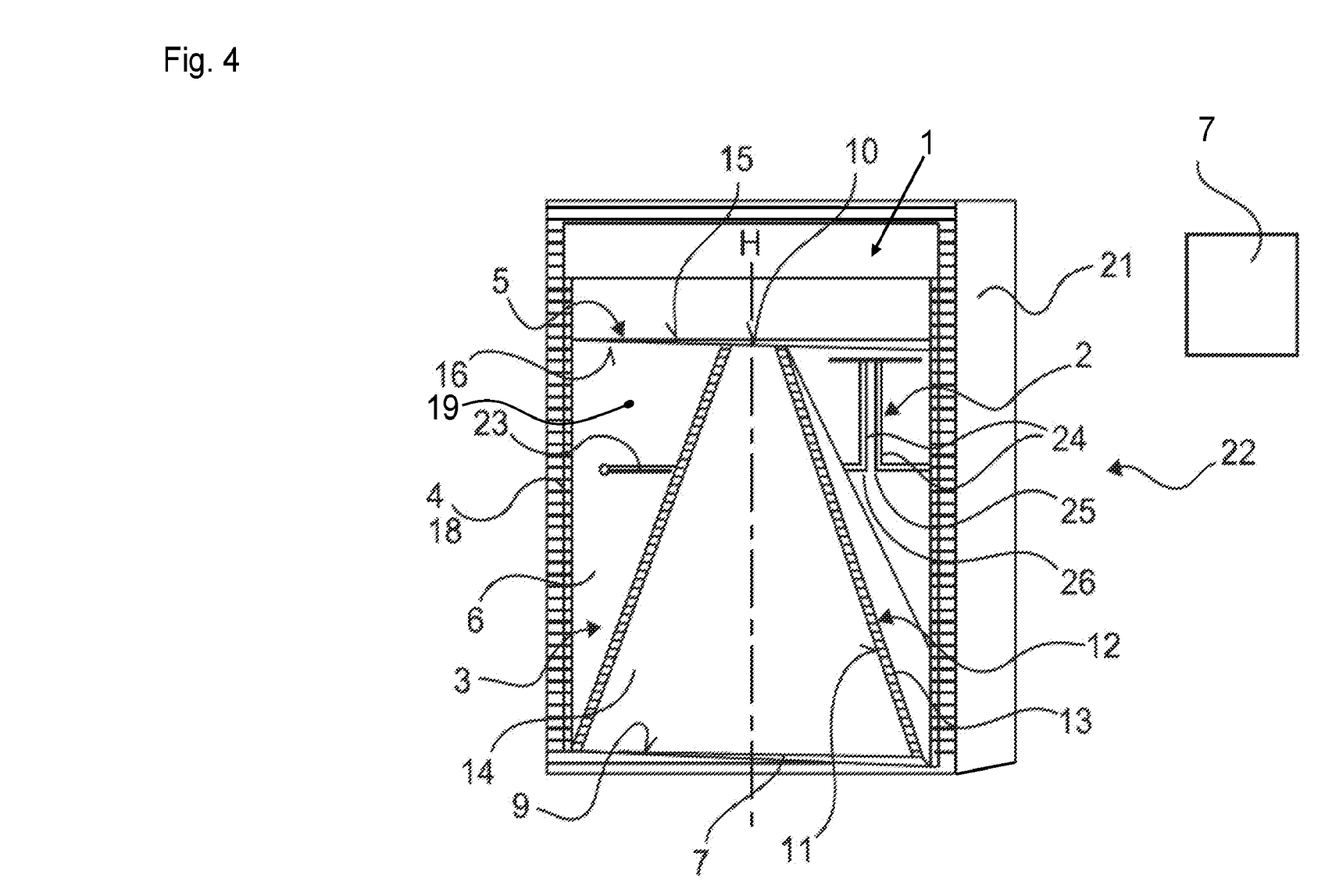
FIG. 4 is a perspective longitudinal sectional view of another embodiment of an antenna array according to the invention with a ring dipole antenna within an outer housing of a filling level measuring device.
Figure 5:
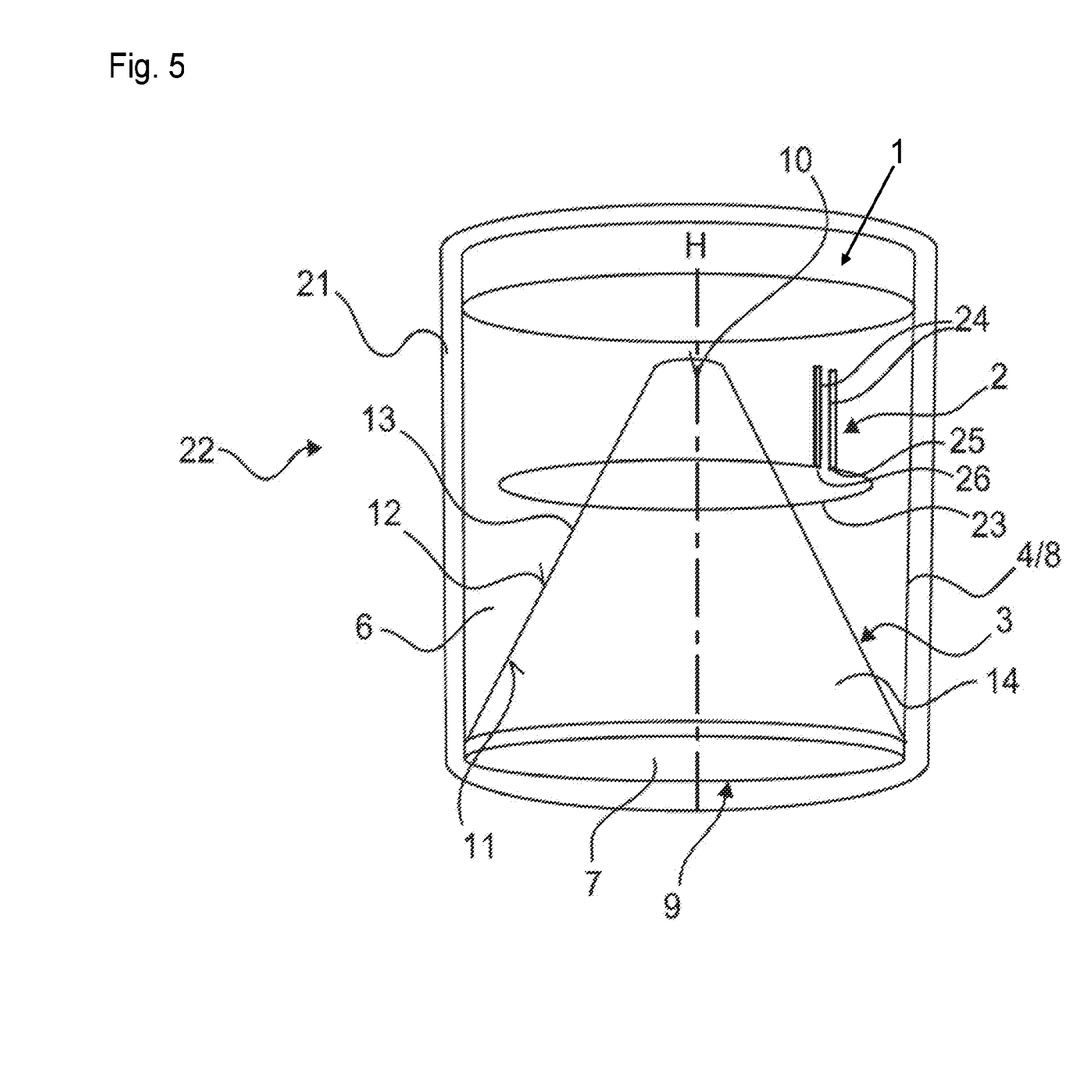
FIG. 5 is a spatial view of the antenna array as per FIG. 4.

FIGS. 4 and 5 show an example of another embodiment of an antenna array 1 according to the invention, wherein the antenna array 1 is designed similarly as the antenna array 1 according to FIGS. 1 to 3, and wherein the antenna array 1 is characterized by the kind and the arrangement of the antenna 2. The antenna 2 can be a Bluetooth antenna in form of a ring dipole antenna. An open ring 23 of the ring dipole antenna 2 runs with distance around the shell surface 12 of the horn antenna 3. The ring dipole antenna 2 comprises two bar-shaped parts 24, which run parallel and with distance to each other. One of the bar-shaped parts 24 is connected with an earth, while the other of the bar-shaped parts 24 serves to connect the signal, similar as the bar-shaped part 17 of the monopole antenna 2 as per FIG. 1, 2 or 3. The ring dipole antenna 4 does not need a ground plane 5, but a ground plane 5 can contribute to shield a printed circuit board against radiation. The bar-shaped parts 24 run parallel to the height axis H of the horn antenna 3 being formed as a truncated cone.

A ratio between the height H of the hollow truncated cone 3 and a length of the bar-shaped parts 24 is approximately 10 to 3 in the example as shown by FIG. 4. However, this is not mandatory.

The connection of the antenna 2 is symmetric, thus a balun (symmetric member, not shown) can be provided on the printed circuit board 5. A capacitor, for example with 0.9 pF can be provided for adjustment purposes. The open ring 23 surrounds the outer shell surface 12 of the cone wall 13, wherein the open ring 23 comprises a constant distance to the shell surface 12 of the cone wall 13. The open ring 23 comprises a first open ending 25 and a second open ending 26, which face each other. The open endings 25 and 26 are each connected with one of the bar-shaped parts 24 or each merge into one of the bar-shaped parts 24.

Figure 6:
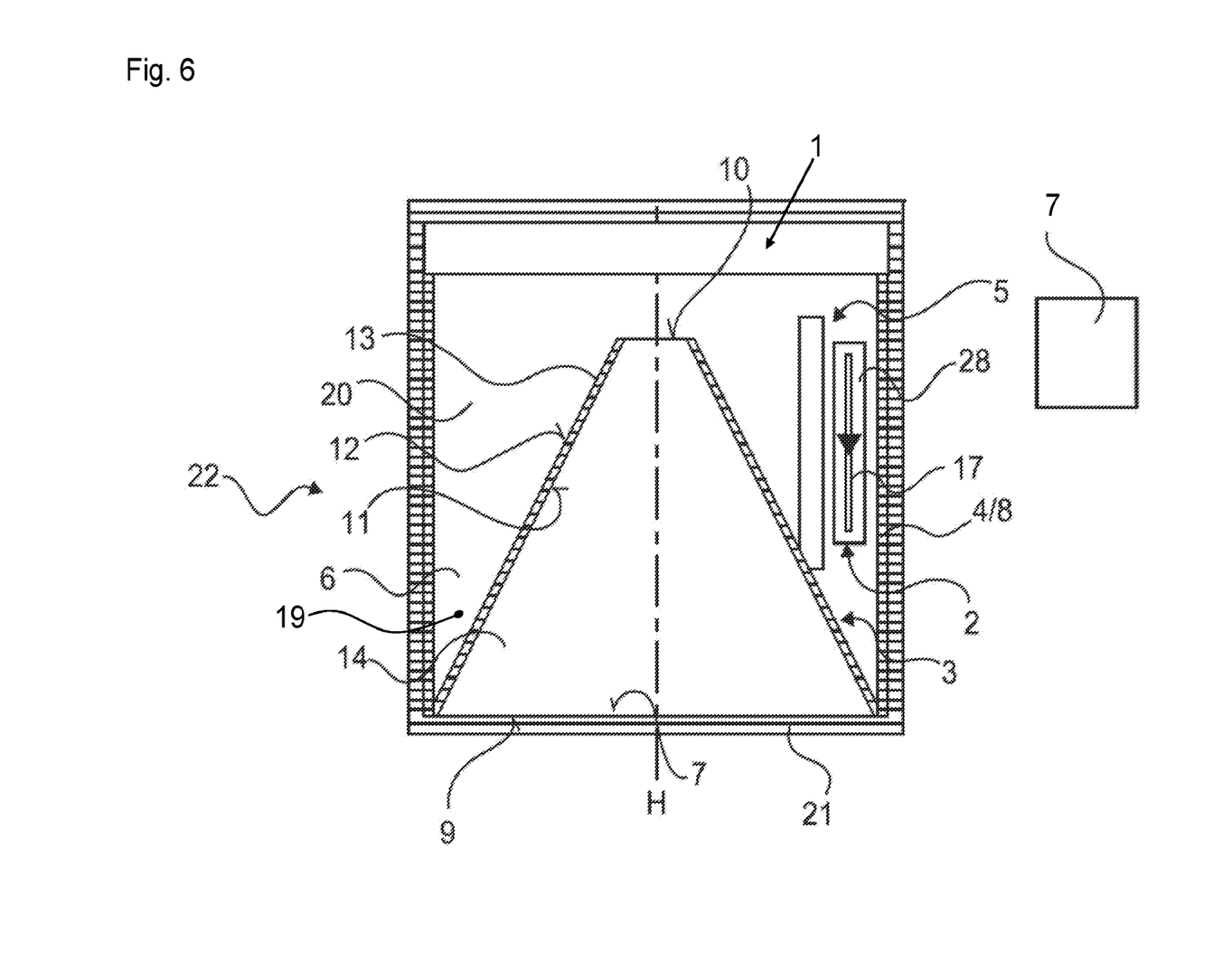
FIG. 6 is a longitudinal sectional view of another embodiment of an antenna array according to the invention with a dipole antenna within an outer housing of a filling level measuring device.

FIG. 6 shows an example of another embodiment of an antenna array 1 according to the invention. The antenna array 1 is designed similarly as the antenna array 1 as per FIG. 1, wherein the antenna array 1 is characterized by the kind and the arrangement of the antenna 2 and by the arrangement of the printed circuit board 5. The antenna 2 is a Bluetooth antenna in form of a rod dipole antenna. In order to keep the construction size of the rod dipole antenna 2 as small as possible, the rod dipole antenna 2 can—as shown by FIGS. 6—be packed in a ceramic sleeve 28. The rod dipole antenna 2—in contrast to the rod monopole antenna 2 as per FIG. 1, 2 or 3—consists of two legs, which each comprise a length of $\lambda/4$. Thus, the rod dipole antenna 2 as per FIG. 6 is principally double as long as the rod monopole antenna 2 as per FIG. 1, 2 or 3. By the use of a casting compound 6 with a relatively high DK value, a relatively high propagation factor can be achieved, such that the length of the rod dipole antenna 2 can be shortened to a practical value. The rod dipole antenna 2 runs laterally next to the horn antenna 3 formed as a truncated cone, and parallel to the central height H of the horn antenna 3 formed as a truncated cone. The rod dipole antenna 2 is—according to the embodiment as per FIG. 6—arranged parallel and with distance to the printed circuit board 5. The printed circuit board 5 and the rod dipole antenna 2 are communicatively connected with each other, wherein the rod dipole antenna 2 transmits data between the printed circuit board 5 and an external device 7 via the Bluetooth connection.

The printed circuit board 5 runs parallel to the rod dipole antenna 2, and does not lie on the cover area 10 of the horn antenna 3. Instead, the printed circuit board 5 is arranged between the rod dipole antenna 2 and the outer shell surface 12 of the cone wall 13 of the horn antenna 3. Due to the casting compound 6, the rod dipole antenna 2 is separated from the inner side of the sidewall 8 of the housing 4 on a side shown right in FIG. 6, and separated from the printed circuit board 5 on a side shown left in FIG. 6. Furthermore, the printed circuit board 5 is separated from the outer shell surface 12 of the horn antenna 3 being formed as a truncated cone by the casting compound 6.

Figure 7:
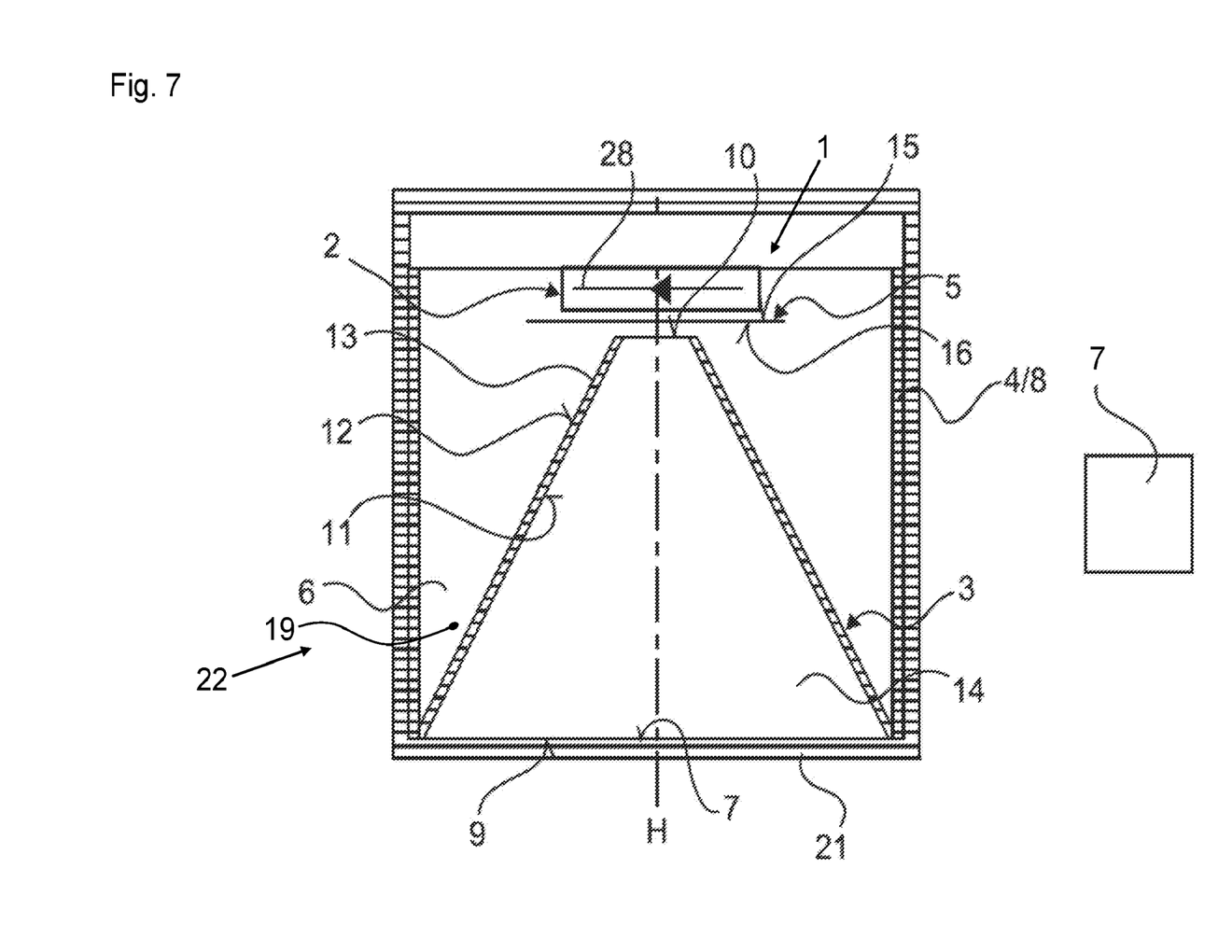
FIG. 7 is a longitudinal sectional view of another embodiment of an antenna array according to the invention with a dipole antenna within an outer housing of a filling level measuring device.

FIG. 7 shows an example of a third embodiment of an antenna array 1 according to the invention, wherein the antenna array 1 is designed similarly as the antenna array 1 as per FIG. 2. The antenna array 1 as per FIG. 7 is characterized by the kind and arrangement of the antenna 2 as well as the arrangement of the printed circuit board 5. The antenna 2 is a Bluetooth antenna in form of a rod dipole antenna. In order to keep the construction size of the rod dipole antenna 2 as small as possible, the rod dipole Bluetooth antenna 2 can be packed in a ceramic sleeve as shown by FIG. 7. The printed circuit board 5 and the rod dipole antenna 2 are communicatively connected with each other, wherein the rod dipole antenna 2 can transmit data between the printed circuit board 5 and an external device 7 via a Bluetooth connection.

The printed circuit board 5 is arranged above and with distance to the cover area 10 of the horn antenna 3 being formed as a truncated cone. The rod dipole antenna 2 is arranged above and with distance to the printed circuit board 5. The printed circuit board 5 runs parallel to the cover area 10. In addition, the rod dipole antenna 2 runs parallel to the cover area 10 and, thus parallel to the printed circuit board 5. The printed circuit board 5 is also separated from the rod dipole antenna 2 and from the cover area 10 of the horn antenna 3 being formed as a truncated cone by the casting compound 6.

Figure 8:
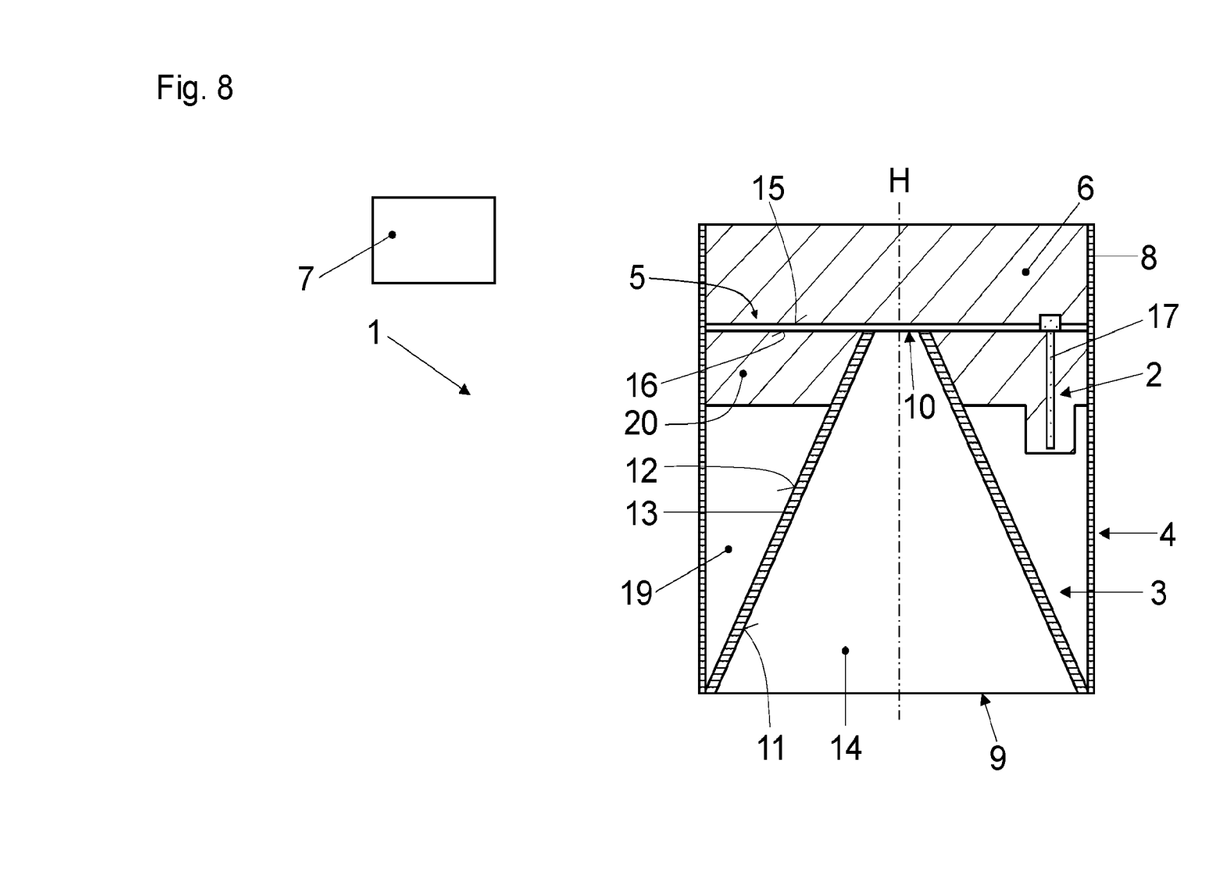
FIG. 8 is a longitudinal sectional view of another embodiment of an antenna array according to the invention with a monopole antenna within a housing which is partially casted with a casting compound.

FIG. 8 shows another exemplary embodiment of an antenna array 1, which is similar to the antenna array 1 as per FIG. 1. The antenna array 1 as per FIG. 8 is different compared to the antenna array as per FIG. 1, in that the rod antenna 2 is completely casted by the casting compound 6, whereas the horn antenna 3 only in its upper area is casted by the casting compound 6. Furthermore, the outer housing 21 of the filling level measuring device 22 is not depicted. Thus, the interior space 19 between the cylindrical wall 8 of the housing 4 and the horn antenna 3 is just partially filled with the casting compound 6. The lower volume area of the interior space 19, which is not filled with the casting compound 6, can for example be filled with a polystyrene form piece, wherein the form of the form piece corresponds to the lower volume area. By this, casting compound 6 and weight can be saved.

The invention claimed is:

1. An antenna array for a filling level measuring device, the antenna array comprising:
   an antenna;
   a horn antenna;
   a plastic housing;
   a printed circuit board; and
   a casting compound,
   wherein
   the antenna is configured to communicatively connect the printed circuit board to an external device, to wirelessly transmit measuring data to the external device and to receive instructions from the external device to initiate or to control filling level measurements,
   the horn antenna includes a form of a hollow truncated cone,
   at least an inner side of the horn antenna is provided with a metallic material,
   the antenna, the horn antenna, the printed circuit board and the casting compound are arranged within the plastic housing,
   the antenna and the horn antenna are at least partially surrounded by the casting compound,
   the antenna is a monopole antenna,
   the antenna is arranged at a ground plane,
   a bar-shaped part of the antenna is arranged laterally next to the horn antenna being formed as the truncated cone, and
   the ground plane rests on a cover area of the horn antenna being formed as the truncated cone.

2. The antenna array according to claim 1, wherein
   the antenna is arranged between the plastic housing and the horn antenna, and
   the antenna is separated from the plastic housing and from the horn antenna by a casting material.

3. The antenna array according to claim 1, wherein
   the antenna is a ring dipole antenna, and
   an open ring of the ring dipole antenna runs with distance around a shell surface of the horn antenna being formed as the truncated cone.

4. The antenna array according to claim 1, wherein the casting compound comprises a dielectric constant of 2.5 or higher.

5. An antenna array for a filling level measuring device, the antenna array comprising:
   an antenna;
   a horn antenna;
   a plastic housing;
   a printed circuit board; and
   a casting compound,
   wherein the antenna is configured to communicatively connect the printed circuit board to an external device, to wirelessly transmit measuring data to the external device and to receive instructions from the external device to initiate or to control filling level measurements,
the horn antenna includes a form of a hollow truncated cone,
at least an inner side of the horn antenna is provided with a metallic material,
the antenna, the horn antenna, the printed circuit board and the casting compound are arranged within the plastic housing,
the antenna and the horn antenna are at least partially surrounded by the casting compound,
the antenna is a dipole antenna,
a bar-shaped part of the dipole antenna is arranged laterally next to the horn antenna being formed as the truncated cone,
a ground plane is arranged between the horn antenna being formed as the truncated cone and the dipole antenna, and
the dipole antenna is separated from the plastic housing and from the horn antenna being formed as the truncated cone by the casting compound.

6. An antenna array for a filling level measuring device, the antenna array comprising:
an antenna;
a horn antenna;
a plastic housing;
a printed circuit board; and
a casting compound,
wherein
the antenna is configured to communicatively connect the printed circuit board to an external device, to wirelessly transmit measuring data to the external device and to receive instructions from the external device to initiate or to control filling level measurements,
the horn antenna includes a form of a hollow truncated cone,
at least an inner side of the horn antenna is provided with a metallic material,
the antenna, the horn antenna, the printed circuit board and the casting compound are arranged within the plastic housing,
the antenna and the horn antenna are at least partially surrounded by the casting compound,
the antenna is a dipole antenna,
the printed circuit board is arranged above a cover area of the horn antenna being formed as the truncated cone,
the dipole antenna is arranged above the printed circuit board, and
the printed circuit board is separated from the dipole antenna and from the horn antenna being formed as the truncated cone by a casting material.

7. A filling level measuring device comprising:
an antenna array including:
an antenna;
a horn antenna;
a plastic housing;
a printed circuit board; and
a casting compound,
wherein
the antenna is configured to communicatively connect the printed circuit board to an external device, to wirelessly transmit measuring data to the external device and to receive instructions from the external device to initiate or to control filling level measurements,
the horn antenna includes a form of a hollow truncated cone,
at least an inner side of the horn antenna is provided with a metallic material,
the antenna, the horn antenna, the printed circuit board and the casting compound are arranged within the plastic housing,
the antenna and the horn antenna are at least partially surrounded by the casting compound,
the antenna is a monopole antenna,
the antenna is arranged at a ground plane,
a bar-shaped part of the antenna is arranged laterally next to the horn antenna being formed as the truncated cone, and
the ground plane rests on a cover area of the horn antenna being formed as the truncated cone.

8. A filling level measuring device comprising:
an antenna array including:
an antenna;
a horn antenna;
a plastic housing;
a printed circuit board; and
a casting compound,
wherein
the antenna is configured to communicatively connect the printed circuit board to an external device, to wirelessly transmit measuring data to the external device and to receive instructions from the external device to initiate or to control filling level measurements,
the horn antenna includes a form of a hollow truncated cone,
at least an inner side of the horn antenna is provided with a metallic material,
the antenna, the horn antenna, the printed circuit board and the casting compound are arranged within the plastic housing,
the antenna and the horn antenna are at least partially surrounded by the casting compound,
the antenna is a dipole antenna,
a bar-shaped part of the dipole antenna is arranged laterally next to the horn antenna being formed as the truncated cone,
a ground plane is arranged between the horn antenna being formed as the truncated cone and the dipole antenna, and
the dipole antenna is separated from the plastic housing and from the horn antenna being formed as the truncated cone by the casting compound.

9. A filling level measuring device comprising:
an antenna array including:
an antenna;
a horn antenna;
a plastic housing;
a printed circuit board; and
a casting compound,
wherein
the antenna is configured to communicatively connect the printed circuit board to an external device, to wirelessly transmit measuring data to the external device and to receive instructions from the external device to initiate or to control filling level measurements,
the horn antenna includes a form of a hollow truncated cone,
at least an inner side of the horn antenna is provided with a metallic material, the antenna, the horn antenna, the printed circuit board and the casting compound are arranged within the plastic housing,
the antenna and the horn antenna are at least partially surrounded by the casting compound,
the antenna is a dipole antenna,
the printed circuit board is arranged above a cover area of the horn antenna being formed as the truncated cone,
the dipole antenna is arranged above the printed circuit board, and
the printed circuit board is separated from the dipole antenna and from the horn antenna being formed as the truncated cone by a casting material.

* * * * *